(12) United States Patent
Cornejo et al.

(10) Patent No.: US 9,359,244 B2
(45) Date of Patent: Jun. 7, 2016

(54) ALUMINA-RICH GLASSES AND METHODS FOR MAKING THE SAME

(71) Applicant: Colorado School of Mines, Golden, CO (US)

(72) Inventors: Ivan A. Cornejo, Denver, CO (US); Ivar E. Reimanis, Golden, CO (US)

(73) Assignee: Colorado School of Mines, Golden, CO (US)

( * ) Notice: Subject to any disclaimer, the term of this patent is extended or adjusted under 35 U.S.C. 154(b) by 0 days.

(21) Appl. No.: 14/283,510

(22) Filed: May 21, 2014

(65) Prior Publication Data

US 2014/0349831 A1 Nov. 27, 2014

Related U.S. Application Data

(60) Provisional application No. 61/825,817, filed on May 21, 2013.

(51) Int. Cl.
| | |
|---|---|
| C03C 11/00 | (2006.01) |
| C03C 3/064 | (2006.01) |
| C03C 10/00 | (2006.01) |
| C03C 23/00 | (2006.01) |

(52) U.S. Cl.
CPC ............. *C03C 3/064* (2013.01); *C03C 10/0054* (2013.01); *C03C 11/005* (2013.01); *C03C 23/008* (2013.01)

(58) Field of Classification Search
CPC ........ C03C 11/005; C03C 3/061; C03C 25/66
USPC .......................................................... 501/39
See application file for complete search history.

(56) References Cited

U.S. PATENT DOCUMENTS

| | | | |
|---|---|---|---|
| 2,106,744 A | 2/1938 | Hood et al. | |
| 2,221,709 A | 11/1940 | Hood et al. | |
| 2,286,275 A | 6/1942 | Hood et al. | |
| 3,785,793 A * | 1/1974 | Park | 65/31 |
| 3,881,944 A * | 5/1975 | Beall et al. | 501/7 |
| 4,097,295 A | 6/1978 | Chyung et al. | |
| 4,319,905 A * | 3/1982 | Macedo et al. | 65/31 |
| 4,657,875 A * | 4/1987 | Nakashima et al. | 501/39 |
| 4,874,153 A | 10/1989 | Hashimoto et al. | |
| 4,933,307 A * | 6/1990 | Marshall et al. | 501/39 |
| 5,772,126 A | 6/1998 | Hanvey et al. | |
| 6,200,475 B1 | 3/2001 | Chen | |
| 6,376,403 B1 | 4/2002 | Koyama et al. | |
| 6,812,177 B2 | 11/2004 | Ishino | |
| 6,897,173 B2 | 5/2005 | Bernard et al. | |

(Continued)

FOREIGN PATENT DOCUMENTS

| | | |
|---|---|---|
| CN | 102099308 | 6/2011 |
| CN | 102730970 | 10/2012 |

(Continued)

OTHER PUBLICATIONS

U.S. Appl. No. 14/477,458, filed Sep. 4, 2014, Cornejo et al.
"Specialty Glass Products Technical Reference Document," Abrisa Technologies, 2012, retrieved from http://abrisatechnologies.com/specs/White%20Flashed%20Opal%20Spec%20Sheet%2012_10.pdf, 2 pages.

(Continued)

*Primary Examiner* — Noah Wiese
(74) *Attorney, Agent, or Firm* — Sheridan Ross P.C.

(57) ABSTRACT

The invention relates to new glass formulations with alumina contents greater than 35 mol % and methods for making these glasses. The glass may be a porous glass or a dense glass.

20 Claims, 8 Drawing Sheets

(56) References Cited

U.S. PATENT DOCUMENTS

| | | |
|---|---|---|
| 7,476,633 B2 | 1/2009 | Comte et al. |
| 7,618,909 B2 | 11/2009 | Fujiwara et al. |
| 7,754,630 B2 | 7/2010 | Doehring et al. |
| 8,211,816 B2 | 7/2012 | Suzuki |
| 8,257,831 B2 | 9/2012 | Yagi |
| 2005/0159291 A1 | 7/2005 | Ritter et al. |
| 2008/0153068 A1 | 6/2008 | Kessler et al. |
| 2008/0248942 A1* | 10/2008 | Borrelli et al. .................. 501/63 |
| 2009/0325776 A1 | 12/2009 | Murata |
| 2010/0035745 A1 | 2/2010 | Murata |
| 2010/0084016 A1 | 4/2010 | Aitken et al. |
| 2010/0087307 A1 | 4/2010 | Murata et al. |
| 2010/0300535 A1 | 12/2010 | Aitken et al. |
| 2011/0003483 A1 | 1/2011 | Nishizawa et al. |
| 2011/0217534 A1 | 9/2011 | Takaya et al. |
| 2011/0293942 A1 | 12/2011 | Cornejo et al. |
| 2012/0063479 A1 | 3/2012 | Li et al. |
| 2012/0178612 A1 | 7/2012 | Takaya et al. |
| 2012/0194064 A1 | 8/2012 | Wada et al. |
| 2012/0196071 A1 | 8/2012 | Cornejo et al. |
| 2012/0251743 A1 | 10/2012 | Amin et al. |
| 2012/0308827 A1 | 12/2012 | Boek et al. |

FOREIGN PATENT DOCUMENTS

| | | |
|---|---|---|
| DE | 4341820 | 6/1995 |
| EP | 373557 | 6/1990 |
| EP | 608257 | 8/1994 |
| JP | 2007-099557 | 4/2007 |
| JP | 2010-180076 | 8/2010 |
| JP | 2011-057504 | 3/2011 |
| JP | 4737709 | 8/2011 |
| JP | 2012-224491 | 11/2012 |
| KR | 10-2012-087997 | 8/2012 |
| WO | WO 2007/058205 | 5/2007 |
| WO | WO 2011/097314 | 8/2011 |
| WO | WO 2011/105246 | 9/2011 |
| WO | WO 2012/126394 | 9/2012 |
| WO | WO 2013/084173 | 6/2013 |

OTHER PUBLICATIONS

"Corning® Gorilla® Glass 3 with NDR™: Product Information Sheet," Corning Incorporated, 2013, retrieved from http://317d462d97c0f60cc4a8-f82dbb2c4b72989b4dd23857c08d6cc5.r13.cf2.rackcdn.com/local/uploads/files/Gorilla%20Glass%203_2320_PI%20Sheet%20RevE_050613.pdf, 2 pages.

"Recycling Organic Waste," Practical Action, The Shumacher Centre fro Technology & Development, 2005, retrieved from http://practicalaction.org/shelter/docs/technical_information_service/recycling_organic_waste.pdf, 10 pages.

"VYCOR®: Brand Porous Glass 7930," Corning Incorporated, 2001, retrieved from http://www.corning.com/docs/specialtymaterials/pisheets/Vycor%207930.pdf, 2 pages.

Beerkens et al., "Advanced Heating Techniques for Glass Melting.", 2002, Technische Universiteit Eindhoven, Edinhoven, Mar. 2002, 44 pages.

Elmer, "Porous and Reconstructed Glass," 1992, Engineered Materials Handbook, vol. 4, Ceramic Glasses, pp. 427-432.

Junko et al., "Process Optimization to Prepare High-purity Amorphous Silica from Rice Husks via Citric Acid Leaching Treatment," Transactions of JWRI, 2008, vol. 37(1), pp. 13-17.

Mtallib et al., "Effects of Eggshells Ash (ESA) on the Setting Time of Cement," Nigerian J. of Tech., 2009, vol. 28(2), pp. 29-38.

Pourreza et al., "Effect of Saline Drinking Water on Egg Shell Quality of Leghorn and Native Hens," J. of Agric. Sci. and Tech., 2000, vol. 1(2), pp. 3-8.

Premuzic et al., "Calcium, Iron, Potassium, Phosphorus, and Vitamin C Content of Organic and Hydroponic Tomatoes," HORTSCIENCE, 1998, vol. 33(2), pp. 255-257.

Shelby, "Chapter 4: Immiscibility/Phase Separation," Introduction to Glass Science and Technology, 2nd edition, The Royal Society of Chemistry, UK, 1991, pp. 51-71.

Zakharov et al., "Forms of Extraction of Silicon Compounds in Rice," Glass and Ceramics, 1993, vol. 50(9-10), pp. 420-425.

Zhang et al., "Characterization of food waste as feedstock for anaerobic digestion," Bioresource Technology, 2007, vol. 98, pp. 929-935.

* cited by examiner

ALUMINA-RICH GLASSES AND METHODS FOR MAKING THE SAME

CROSS REFERENCE TO RELATED APPLICATIONS

This application claims priority under 35 U.S.C. §119(e) to U.S. Provisional Application Ser. No. 61/825,817, filed on May 21, 2013, which is incorporated herein in its entirety by reference.

TECHNICAL FIELD

The invention relates to new glass formulations with alumina contents greater than about 35 mol % and methods for making these glasses.

BACKGROUND OF INVENTION

Glass manufacturing has a long history dating back to ancient Mesopotamia. Since then, the process of making glass and glass related products has developed into a complex mix of formulation chemistry, metallurgy, material science, engineering and art. Gorilla® Glass, a product of Corning Incorporated, DragonTrail™ Glass, by Asahi Glass Company, and Xensation® Cover Glass by SCHOTT illustrate some of the more recent advances made in glass strengthening technology.

Ion-exchanged glasses were first described by Kistler (1962) for soda-lime glass. This work was followed by Nordberg in 1964 for an alkali-alumina-silica glass and for an alkali-zirconia-silica glass. "Chemcor" was developed in 1960 by Corning Inc. and had few applications beyond windshields for race cars. However, the application environment for strengthened glasses has changed dramatically with the advent of personal electronic devices, video games, and touch technology. Most smartphones, tablets, and laptops are covered with one of these glasses, which exhibit excellent mechanical fracture resistance while maintaining good thermal and optical properties. The composition of "modern" ion-exchanged glasses is a trade-secret, however, its post-glass-production processing utilizes ion-exchange to replace small ions, such as lithium and/or sodium, with larger ions, such as sodium, potassium, or even rubidium, which results in a stronger, more durable final glass product.

Glass production and composition are inextricably tied together. A very simple glass formulation is pure silica. It contains just one ingredient: $SiO_2$. Although silica itself forms an excellent glass with a wide range of applications, its use in everyday applications is prohibitively expensive due to its extremely high melting temperature (>1700° C.). This negatively impacts the cost to build continuous melters that can withstand the high temperature needed to reduce the viscosity of the glass below about 200-500 poise, resulting in prohibitively high capital and operating costs. Therefore, silica glasses require the addition of a flux to reduce the processing temperature to within practical limits, e.g. <1700° C. The most common fluxes are alkali and alkaline earth oxides. Most commercial glasses contain soda ($Na_2O$) and lime (CaO), including those used for containers and window glasses. However, while the addition of fluxes to silica leads to decreased cost for the glass manufacturing, the addition of large amounts of alkali oxide results in degradation of the glass properties, in particular degradation in mechanical, chemical and optical properties. This degradation is particularly prevalent in glass substrates for liquid crystal displays that must be alkali-free. Low-cost manufacturing glasses such as soda-lime cannot compete with the new active matrix liquid crystal display (AMLCD) substrates available in the market. Some of the loss in glass physical properties can be countered by the addition of property modifiers, which include the alkaline earth oxides and transition metal oxides for some applications.

In an effort to find a more cost effective route to a high silica glass formulation, Hood and Nordberg, from Corning Glass Works, developed the process to produce Vycor® and is described in U.S. Pat. No. 2,106,744, U.S. Pat. No. 2,221,709, and U.S. Pat. No. 2,286,275, each of which is incorporated by referenced in their entirety. Vycor® is a glass with a composition that is 96% $SiO_2$, 3% $B_2O_3$, 0.4% $Na_2O$, and less than 1% $Al_2O_3$ and $ZrO_2$. The high silica content provides very high temperature and thermal shock resistance. However, unlike pure fused silica, it can be manufactured into a variety of shapes, and manufacturing does not involve extremely high temperatures. The Hood and Nordberg process is a multi-step process that first creates a relatively soft alkali borosilicate glass. This material is then heat treated, which causes it to separate into two distinct glassy phases with differing chemical compositions. One phase is rich in alkali and boric oxide, this phase being acid soluble. The other phase is mostly insoluble silica. After the heat treatment, the two-phase "workpiece" is immersed in a hot, dilute acid solution. The soluble alkali phase is slowly dissolved, leaving behind a porous high-silica skeleton. The silica phase is then heated to above 1200° C., which consolidates the porous structure into a final dense, nonporous, high silica glass (Vycor®). The finished material resulting from this process is referred to in the industry as "reconstructed glass."

Another abundant raw material in the earth's crust is alumina ($Al_2O_3$). Sapphire is the single crystal form of alumina, which has remarkable mechanical, optical, and electrical properties. Like silica, alumina has a very high melting point (>2000° C.), is very hard and is completely water insoluble. It is also an excellent electrical insulator and has a high thermal conductivity. In 1966, GE produced an alumina ceramic (with some crystalline content) called Lucalox™ and began selling the material in transparent alumina light bulbs. To make high alumina containing glasses, alumina is usually mixed with other oxides. For example, alkali aluminoborate glasses are commonly used for the production of reinforcing glass fiber (E-glass). However, a typical E-glass composition is about 57 mol % silica, 8.8 mol % alumina, 19.6 mol % CaO, 6.1 mol % $B_2O_3$, with the remainder consisting of MgO, $Na_2O$, $K_2O$, $Fe_2O_3$, $TiO_2$ and F.

Although examples of high silica glasses and alumina ceramics are available, there is still a need for a low temperature (<1700° C.) production method for the manufacture of high alumina containing glasses (e.g. >35 mol %) with simpler formulations.

SUMMARY OF INVENTION

The present invention provides a novel, low temperature method for producing high alumina content glasses comprising ternary and quaternary oxide formulations that approximate the natural physical properties of sapphire. One aspect of the invention is a method for producing a porous high alumina content glass, comprising the formation of a starting glass with a mixture comprising greater than about 20 mol % alumina and an oxide. The oxide may comprise at least one of $B_2O_3$, $P_2O_5$, $Na_2O$, $K_2O$, $Li_2O$, CaO, MgO, BaO, SrO, and $SiO_2$. The mixture is melted at temperatures below about 1700° C., and a glass is formed by quenching the mixture, then heat-treating the starting glass to produce an alumina-rich phase and an alumina-lean phase. The phase separated glass is leached to leach the alumina-lean phase with an acid to produce a porous high alumina content glass. The porous high alumina content glass has a final alumina concentration of greater than about 35 mol %.

Another aspect of the invention is a porous high alumina content glass comprising greater than about 35 mol % alumina and an oxide.

Another aspect of the invention is a method to form a high content alumina glass. The method includes mixing an alumina powder and an oxide powder to form a mixture, wherein the alumina powder comprises at least about 20 mol % of the mixture and wherein the oxide comprises at least about 80% of the mixture, calcining the mixture to form a calcined mixture, melting the calcined mixture to form a melt, quenching the melt to form a quenched glassy material, annealing the quenched material to form an annealed material, nucleating an embryo to initiate phase separation; gradually changing the embryo with the annealed material to form a phased material, wherein the phased material comprises an alumina-rich phase and an alumina-lean phase, and leaching the separated material to leach the alumina-lean phase to produce a high content alumina glass.

DESCRIPTION OF EMBODIMENTS

An aspect of the invention is a method for producing a porous high alumina content glass, the method comprising forming a mixture comprising greater than about 20 mol % alumina and between about 30 mol % to about 80 mol % of an oxide. The mixture is heat-treated to produce a phase separated glass comprising an alumina-rich phase and an alumina-lean phase, cooling the phase separated glass to room temperature, and leaching the alumina-lean phase from the alumina-rich phase with an acid to produce a porous high alumina content glass.

The porous high alumina content glass might contain an alumina content between about 20 mol % and about 70 mol %. In some embodiments, the alumina content may be between about 20 mol % and about 50 mol %. In some embodiments the alumina content is about 35 mol %, about 40 mol %, about 45 mol %, about 50 mol %, about 55 mol %, about 60 mol %, about 65 mol %, or about 70 mol %.

The oxide may be at least one of $B_2O_3$, $P_2O_5$, $Na_2O$, $K_2O$, $Li_2O$, CaO, MgO, SrO, BaO, $SiO_2$, and $TiO_2$. In some embodiments of the invention, the oxide may comprise at least one of $B_2O_3$, $P_2O_5$, $Na_2O$, $K_2O$, CaO, and BaO. In some embodiments of the invention, the oxide may be a combination of a $B_2O_3$, and a $Na_2O$. In some embodiments the oxide may be a combination of a $B_2O_3$, and a $P_2O_5$. In some embodiments, the oxide may be a combination of a $B_2O_3$, a $P_2O_5$, and a $Na_2O$.

The oxide content may comprise between about 30 mol % to about 80 mol % of the mixture. In some embodiments, the oxide content may comprise between about 60 mol % to about 80 mol % of the mixture. In still other embodiments, the oxide content may comprise about 30 mol %, about 50 mol %, about 60 mol %, about 75 mol %, or about 80 mol %.

The invention may further include a calcination step following the mixture of the alumina and oxide. The calcination may occur in any suitable environment, including in air or in an inert atmosphere. The calcinations may occur at atmospheric pressure or at reduced pressure, and the pressure of the calcinations may be determined based on the oxide used in the mixture. The calcination temperature may be between about 300° C. and about 600° C. In some embodiments, the calcination temperature may be about 300° C., about 400° C., about 500° C. or about 600° C. The calcination may occur for between about 1 hour to about 10 hours. In some embodiments, the calcination occurs for about 1 hour, 2 hours, about 3 hours, about 4 hours, about 5 hours, about 6 hours, about 7 hours, about 8 hours, about 9 hours, or about 10 hours.

In some embodiments, at least one dopant may be introduced to the mixture. Many different dopants may be used. By way of non-limiting example, the dopant may remove bubbles, may add color to the glass, or may induce phase separation. Less than about 2 wt % of the dopant(s) may be used in the mixture. Suitable dopants include tin oxide, cerium oxide, sulfur oxide, water and the like, which may be used for fining, and cobalt oxide, copper oxide, gold, silver, and the like for coloring.

The heat-treating step may be at a temperature between about 300° C. and about 1000° C. In some embodiments, the temperature is about 400° C., about 450° C., about 500° C., about 550° C., about 600° C., about 650° C., about 700° C., about 750° C., about 800° C., about 850° C., about 900° C., about 950° C., or about 1000° C. The heat-treating step may be performed in equipment such as an electric furnace, a cupula, a gas fired furnace, and any other suitable glass producing equipment. The heat-treating step may occur for a time period between about 30 minutes and about 48 hours. In some embodiments, the heat treatment may occur for about 30 minutes, about 1 hour, about 4 hours, about 8 hours, about 12 hours, about 16 hours, about 20 hours, about 24 hours, or about 48 hours. The heat treatment may occur at atmospheric pressure, under vacuum, in air.

The acid used to leach the alumina-lean phase may be any suitable acid. In some embodiments, the acid may be at least one of hydrochloric acid, nitric acid, sulfuric acid, phosphoric acid, hydrobromic acid, hydrofluoric acid, halogen oxoacids water, boiling water, and any other suitable acid. The concentration of the acid may be between about 2 vol % to about 10 vol % of the acid in water.

The leaching step may be at a temperature between about 25° C. and about 100° C. In some embodiments, the leaching temperature may be about 25° C., about 30° C., about 35° C., about 40° C., about 45° C., about 50° C., about 55° C., about 60° C., about 65° C., about 70° C., about 75° C., about 80° C., about 85° C., about 90° C., about 95° C. or about 100° C. The leaching may be performed with the acid in the liquid state. Alternatively, the leaching may be performed with the acid in the vapor state. The leaching step may occur at a leaching rate of between about 0.5 mm/hr and about 2 mm/hr of the alumina-lean phase and a leaching rate of about 0.05 mm/hr and about 0.1 mm/hr of alumina-rich phase. The leaching step may occur for a time period between about 30 minutes and about 24 hours. In some embodiments, the leaching may occur for about 1 hour, about 2 hours, about 4 hours, about 6 hours, about 8 hours, about 10 hours, or about 12 hours.

The leaching step may occur in any suitable container. Suitable containers include, but are not limited to, glass containers, alumina containers, metal containers, noble metal containers, Teflon and the like. It is known that the material of the container, for example an alumina crucible, used in the leaching step may be leached from the container during the leaching step. Thus, in some embodiments, the mixture formulation may be adjusted to take into account leaching of the crucible material during the leaching step. In some embodiments, a noble metal crucible may be used to minimize leaching of the crucible material.

The invention may further comprise washing the porous high alumina content glass with a water to produce a washed glass, drying the washed glass to produce a dry glass, and firing the dry glass to produce a dense high alumina content glass. The water used during the wash may be distilled water. The drying temperature may be at least about 90° C. In some embodiments, the drying temperature may be about 100° C. The drying time may be between about 1 hour and about 15 hours. One skilled in the art would understand that the drying temperature mainly removes the water exposed to the glass during the wash, and may also remove contaminants from the glass. The drying temperature and drying time may be dependent upon the dimensions of the glass. Furthermore, drying may occur under vacuum, which may also affect the drying temperature and drying time.

The firing temperature may be about 500° C. and about 900° C. In some embodiments, the firing temperature may be about 500 C, about 600 C, about 700° C., about 725° C., about 750° C., about 775° C., about 800° C., about 825° C., about 850° C., about 875° C., about or 900° C. The firing may occur for a time period between about 30 minutes and about 12 hours. In some embodiments, firing may occur for about 1 hour, about 2 hours, about 3 hours, about 4 hours, about 5 hours, about 6 hours, about 7 hours, about 8 hours, about 9 hours, or about 10 hours. The firing step may occur for a time period between about 1 hour and about 10 hours. In some embodiments, the firing step may occur for about 2 hours, about 3 hours, about 4 hours, or about 5 hours. The firing step may be performed in equipment selected from the group consisting of an electric furnace, a cupula, a gas fired furnace, and any other suitable glass producing equipment.

The porosity, or void fraction, of the porous high content glass may be between 15 vol. % and about 35 vol. %. Following the optional additional steps of washing, drying and firing, the porous high content glass may become more dense, resulting in a porosity of between about 0 vol. % and less than about 5 vol. %.

One aspect of the invention is a porous high alumina content glass comprising greater than about 20 mol % alumina and an oxide.

The porosity of the high alumina content glass may vary depending on the process conditions when forming the glass. The porosity of the porous high alumina content glass may be between about 0 vol. % and about 35 vol. % based on the treatment of the glass. In some embodiments, the porosity may be about 0 vol. %, about 20 vol. %, about 30 vol. %, or about 35 vol. %. In some further embodiments of the invention, the porosity of the dense high alumina content glass may be about 0 vol. %.

The oxide may be at least one of $B_2O_3$, $P_2O_5$, $Na_2O$, $K_2O$, $Li_2O$, $CaO$, $MgO$, $SrO$, $BaO$, $SiO_2$, $TiO_2$ and mixtures thereof. The oxide of the invention may comprise between about 30 mol % and about 75 mol % of the high alumina content glass. In some embodiments, the oxide may comprise between about 35 mol % to about 60 mol % of the mixture. In still other embodiments, the oxide may comprise about 30 mol %, about 50 mol %, or about 60 mol %.

By way of example, the oxide may be a combination of $B_2O_3$ and $Na_2O$, where the concentration of $B_2O_3$ may be between about 10 mol % and about 60 mol % and the concentration of $Na_2O$ may be between about 5 mol % and about 35 mol %. In another non-limiting example, the oxide of the high alumina content glass may include $B_2O_3$ and $P_2O_5$. The $B_2O_3$ may be at a concentration between about 10 mol % and about 60 mol % and the $P_2O_5$ may be at a concentration between about 0 mol % to about 40 mol %. In still another non-limiting example, the oxide of the dense high alumina content glass may include $B_2O_3$, $P_2O_5$ and $Na_2O$. The $B_2O_3$ may be at a concentration between about 10 mol % and about 60 mol %, the $P_2O_5$ may be at a concentration between about 0 mol % and about 40 mol % and the $Na_2O$ may be at a concentration between about 5 mol % and about 35 mol %.

The porous alumina high alumina content glass may comprise at least one dopant. Suitable dopants include, but are not limited to tin oxide, cerium oxide, sulfur oxide, water and the like, which may be used for fining, and cobalt oxide, copper oxide, gold, silver, and the like for coloring.

Another aspect of the invention relates to a method to form a high content alumina glass, the method comprising forming a mixture of alumina powder and an oxide powder, wherein the mixture comprises at least about 20 mol % of alumina and at least about 30 mol % of an oxide. The mixed powder is calcined to form a calcined powder. Calcination helps to prevent a foam from forming during the melting step. The calcined powder is then melted to form a melt, and the melt is quenched followed by an annealing step to form an annealed material. The annealed material undergoes a two step phase separation process where the glass is nucleated, gradually changing the nucleated embryo with an annealed material, followed by the phase separation.

The calcination may occur in any suitable environment, including in air or in an inert atmosphere. The calcinations may occur at atmospheric pressure or at reduced pressure, and the pressure of the calcinations may be determined based on the oxide used in the mixture. The calcination temperature may be between about 300° C. and about 600° C. In some embodiments, the calcination temperature may be about 300° C., about 400° C., about 500° C. or about 600° C. The calcinations may occur for between about 1 hours and about 10 hours. In some embodiments, the calcination may occur for about 2 hours, about 3 hours, about 4 hours, about 5 hours, about 6 hours, about 7 hours, about 8 hours, about 9 hours, or about 10 hours.

The melting step may be carried out in any suitable container. In some embodiments, the melting may occur in an alumina container, a metal container, a noble metal container, or the like. The melting temperature may be between about 1000° C. and about 1500° C. In some embodiments, the melting temperature may be about 1000° C., 1100° C., about 1200° C., about 1300° C., about 1400° C., about 1450° C., or about 1500° C. The melting time may occur for between about 1 hour and about 6 hours. In some embodiments, the melting time may occur for about 1 hour, about 2 hours, about 3 hours, about 4 hours, about 5 hours, or about 6 hours.

The annealing step may occur at a temperature between about 300° C. and about 600° C. In some embodiments, the annealing temperature may be about 300° C., about 400° C., about 500° C., or about 600° C. The annealing may occur for between about 15 minutes and about 2 hours. In some embodiments, the annealing may occur for about 15 minutes, about 30 minutes, about 1 hour, about 1.5 hours, or about 2 hours.

During nucleation, an embryo is used to initiate phase separation. The embryo is gradually changed with an annealed material to form a phased material, wherein the phased material comprises an alumina-rich phase and an alumina-lean phase, and leaching the separated material to leach the alumina-lean phase to produce a high content alumina glass. The nucleation step may be at a nucleation temperature of between about 300° C. and about 600° C. In some embodiments, the nucleation temperature may be about 400° C., about 450° C., about 500° C. or about 600° C. The time duration for the nucleation step may be between about 0.5 hours and about 3 hours. The phase growth duration may be between about 0.5 hours and about 3 hours. The phase separation temperature may be between about 400° C. and about 800° C. The phase separation produces an alumina-rich phase and an alumina lean phase.

An acid may be used to leach the alumina-lean phase following the phase separation. The acid used to leach the alumina-lean phase may be any suitable acid. In some embodiments, the acid may be at least one of hydrochloric acid, nitric acid, sulfuric acid, phosphoric acid, hydrobromic acid, hydrofluoric acid, halogen oxoacids water, boiling water and any other suitable acid. The concentration of the acid may be between about 2 vol % and about 10 vol % of the acid in water.

The leaching step may be at a temperature between about 25° C. and about 100° C. In some embodiments, the leaching temperature may be about 25° C., about 30° C., about 35° C., about 40° C., about 45° C., about 50° C., about 55° C., about 60° C., about 65° C., about 70° C., about 75° C., about 80° C., about 85° C., about 90° C., about 95° C. or about 100° C. The leaching may be done with the acid in the liquid state. Alternatively, the leaching may be done with the acid in the vapor state. The leaching rate may be between about 0.5 mm/hr and about 2 mm/hr of the alumina-lean phase and a leaching rate of about 0.05 mm/hr and about 0.1 mm/hr of alumina-rich phase. The leaching step may occur for a time period between about 30 minutes and about 24 hours. In some embodiments, the leaching may occur for about 1 hour, about 2 hours, about 4 hours, about 6 hours, about 8 hours, about 10 hours, or about 12 hours.

The leaching step may occur in any suitable container. Suitable containers include, but are not limited to, glass containers, alumina containers, metal containers, noble metal containers and the like. It is known that the material of the container, for example an alumina crucible, used in the leaching step may be leached from the container during the leaching step. Thus, in some embodiments, the mixture formulation may be adjusted to take into account leaching of the crucible material during the leaching step. In some embodiments, a noble metal crucible may be used.

In some embodiments, the invention further comprises washing the porous high alumina content glass with a water to produce a washed glass, drying the washed glass to produce a dry glass, and firing the dry glass to produce a dense high alumina content glass. The dense high alumina content glass may have an alumina concentration of greater than about 35 mol %, about 45 mol %, about 50 mol %, about 55 mol %, about 60 mol %, about 65 mol %, about 70 mol %, about 75 mol %, or about 80 mol %. In a further embodiment of the invention, the dense high alumina content glass may have a final alumina concentration of greater than about 35 mol %, about 40 mol %, about 45 mol %, about 50 mol %, about 55 mol %, about 60 mol %, about 65 mol %, about 70 mol %, or about 75 mol %.

The firing temperature may be about 700° C. and about 1000° C. In some embodiments, the firing temperature may be about 700° C., about 725° C., about 750° C., about 775° C., about 800° C., about 825° C., about 850° C., about 875° C., about 900° C., about 925° C., about 950° C., or about 960° C. The firing may occur for a time period between about 30 minutes and about 12 hours. In some embodiments, firing may occur for about 1 hour, about 2 hours, about 3 hours, about 4 hours, about 5 hours, about 6 hours, about 7 hours, about 8 hours, about 9 hours, and about 10 hours. The firing step may occur for a time period between about 1 hour and about 10 hours. In some embodiments, the firing step may occur for about 2 hours, about 3 hours, about 4 hours, or about 5 hours.

The firing step may be performed in equipment selected from the group consisting of an electric furnace, a cupula, a gas fired furnace, and any other suitable glass producing equipment.

Figure 1:
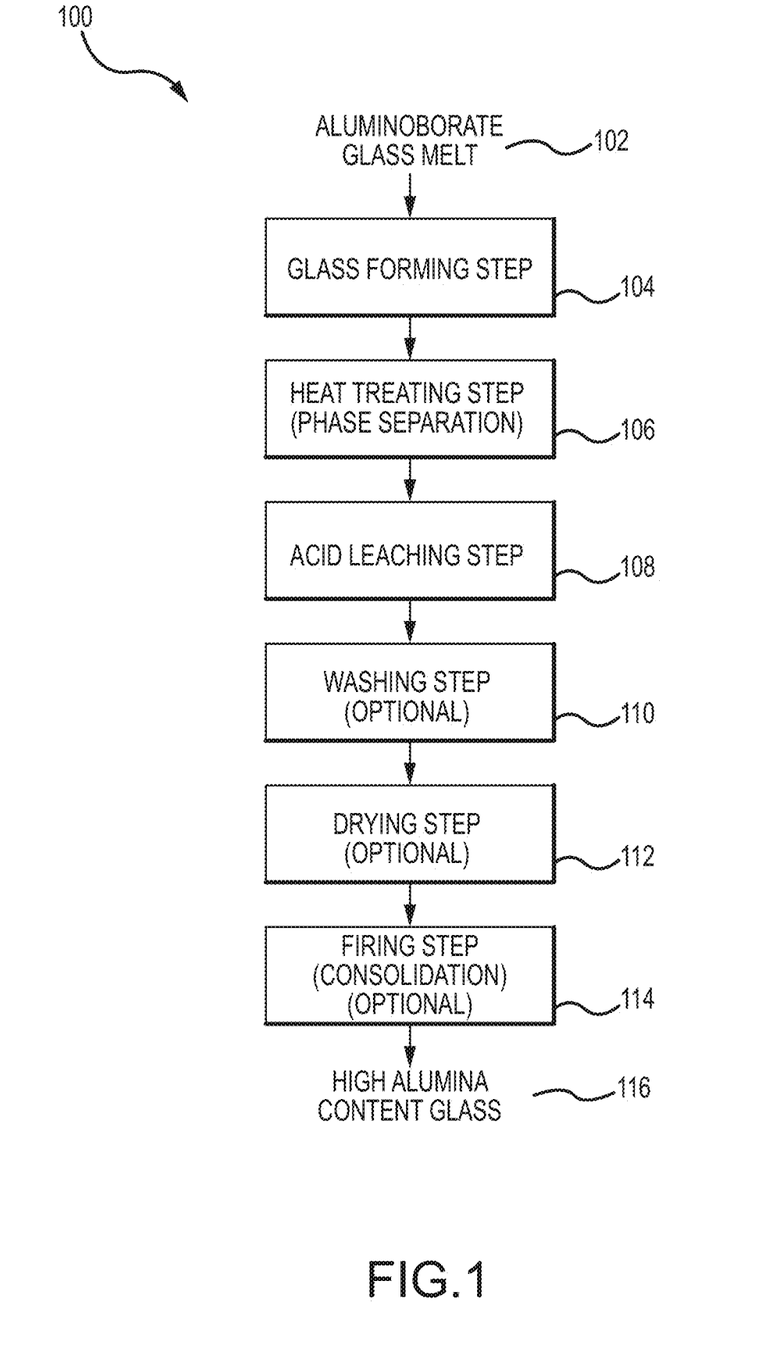
FIG. 1 illustrates a flow diagram for an aspect to produce a high alumina content glasses.

FIG. 1 illustrates a flow diagram for an aspect of the invention to produce a high alumina content glass 116. Aluminoborate glass is melted at step 102. The glass is formed at step 104. The heat treatment step 106 forms the phase separation of alumina-rich phase and alumina-lean phase in the glass. The acid leaching step 108 leaches the alumina-lean phase in the glass. Optionally, the leached glass may be washed during the washing step 110 and subsequently dried in the drying step 112. The firing step 114 consolidates the glass to an about 100% dense material. The final product of the dense high alumina content glass is formed 116.

EXAMPLES

Example 1

Table 1 illustrates ray diffraction (XRD) data for NAB and R$_2$RAB based glasses made with the invention. The glass compositions are reported as approximate mol % as calculated from batches for melting the glasses. The x-ray diffraction (XRD) data for NAB and R$_2$RAB based glasses of Table 1 are illustrated in FIG. 2. These data demonstrate that NAB 006 is amorphous, and therefore a glass.

TABLE 1

| Oxides | 890 GUF | 890 GUG | NAB 003 | NAB 009 | NAB 006 | NAB 008 | NAB 005 | Glass H | Glass I |
|---|---|---|---|---|---|---|---|---|---|
| $Al_2O_3$ | 16 | 20 | 33.333 | 25 | 28.57 | 40 | 40 | 50 | 50 |
| $B_2O_3$ | 38.6 | 34.6 | 33.333 | 50 | 42.86 | 45 | 40 | 30 | 40 |
| $Na_2O$ | 6 | 6 | 33.334 | 25 | 28.57 | 15 | 20 | 0 | 0 |
| $P_2O_5$ | 1.7 | 1.7 | 0 | 0 | 0 | 0 | 0 | 20 | 10 |
| $K_2O$ | 7.9 | 7.9 | 0 | 0 | 0 | 0 | 0 | 0 | 0 |
| MgO | 7.7 | 7.7 | 0 | 0 | 0 | 0 | 0 | 0 | 0 |
| CaO | 22.1 | 22.1 | 0 | 0 | 0 | 0 | 0 | 0 | 0 |

Example 2

Figure 2A:
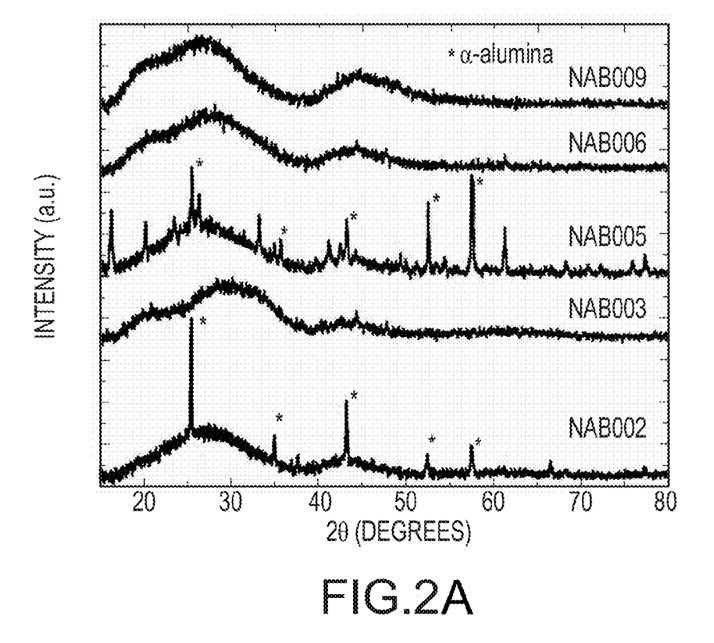
FIG. 2A illustrates x-ray diffraction of NAB based glasses.
Figure 2B:
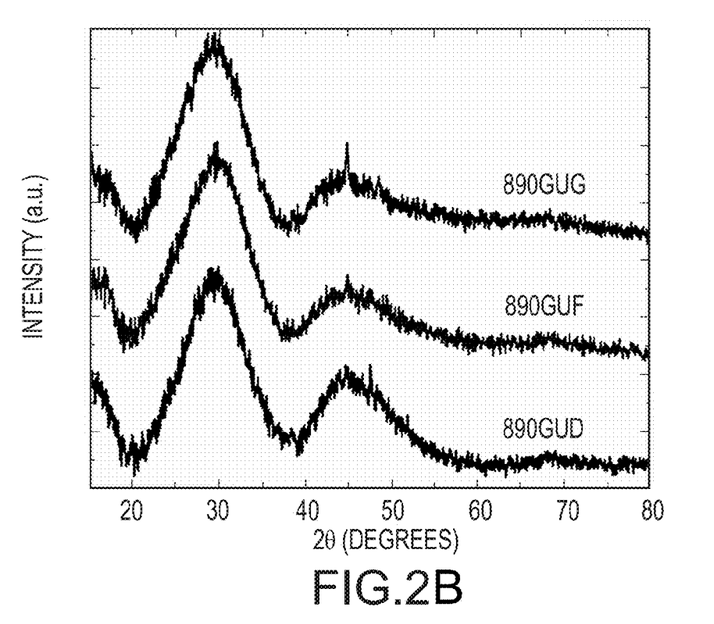
FIG. 2B illustrates x-ray diffraction of $R_2RAB$ based glasses.

In a typical glass research procedure, batches for the above glasses are compounded, mixed, and melted in alumina, quartz, or platinum crucible at 1400° C. The melts are then cast into glass ingots and annealed at about 500-600° C. to provide stress-free castings. Table 3 lists compositions made for the $Al_2O_3$—$B_2O_3$—$P_2O_5$+RO+$R_2O$ system. FIG. 2 illustrates XRD patterns for NAB and 890 glasses. The composition of alumina with content above 40 mol % (for NAB 002 and NAB 005) as illustrated in FIG. 2A present some crystalline peaks while the composition with alumina content between about 25 mol % and about 33 mol % of alumina are amorphous. The "*" illustrates α-alumina. FIG. 2B illustrates XRD patters of $R_2$RAB based glass compositions showing amorphous nature of these glasses.

Structural Identification

Samples from the as-annealed glasses were characterized using XRD to verify the amorphous nature of these materials. XRD was carried out using a Philips X'Pert Pro MPD Diffractometer (PANalytical, Almero, Netherlands) with a copper source ($\lambda=1.54$ Å) and a nickel filter. An X'Celerator detector was used for all the analysis.

The XRD patterns of the as-formed glasses in the NAB system are illustrated in FIG. 2A. The XRD patterns illustrate broad peaks confirming the amorphous nature of these glasses. It is also seen that increased crystallization and/or un-melted α-alumina was observed in specimens containing more than about 40 mol % alumina as illustrated in the diffraction patterns of glasses NAB002 and NAB005.

The XRD patterns of the as-formed glasses in the $R_2$RAB XRD system are shown in FIG. 2B. Lower alumina contents in these glass compositions aid the formation of a glass and all the diffraction patterns indicate that these glasses are amorphous.

Inductively coupled plasma mass spectrometry (ICP) analysis of the samples are listed in Table 2 (data in approximate mol %).

TABLE 2

| Oxides | 890GUB | 890GUC | 890GUD | 890GUE | 890GUF | 890GUG |
|---|---|---|---|---|---|---|
| $SiO_2$ | 0.86 | 0.88 | 1.06 | 1.25 | 0.54 | 0.33 |
| $Al_2O_3$ | 0.03 | 3.80 | 7.64 | 12.93 | 15.56 | 19.33 |
| $Fe_2O_3$ | 0.01 | 0.01 | 0.01 | 0.01 | 0.01 | 0.01 |
| MgO | 8.14 | 8.08 | 8.27 | 7.46 | 8.43 | 8.95 |
| CaO | 22.78 | 22.32 | 23.07 | 23.50 | 23.43 | 22.70 |
| $Na_2O$ | 5.53 | 5.49 | 5.48 | 5.99 | 5.56 | 5.67 |
| $K_2O$ | 7.35 | 7.25 | 7.04 | 0.03 | 7.11 | 7.18 |
| $P_2O_5$ | 2.55 | 1.79 | 1.98 | 1.80 | 1.83 | 1.77 |
| $SO_3$ | 0.00 | 0.00 | 0.00 | 0.00 | 0.00 | 0.00 |
| $Cl^-$ | 0.00 | 0.00 | 0.00 | 0.00 | 0.00 | 0.00 |
| $B_2O_3$ | 52.74 | 50.39 | 45.45 | 47.03 | 37.54 | 34.06 |
| Total | 100 | 100 | 100 | 100 | 100 | 100 |

Iron is a contaminant, and $SiO_2$ is an artifact of the measurement.

Example 3

ICP data for a control sample of bioglass (890GUC) and a glass made with the invention (NAB 006) was gathered and listed in Table 3. The units for the values in Table 3 are wt. % and are approximate values.

TABLE 3

| | 890 GUC | | | NAB 006 | | |
|---|---|---|---|---|---|---|
| Oxide | Batched | ICP1 | ICP2 | Oxide | ICP 2 | Normalized |
| $SiO_2$ | 0.2 | 0.77 | 0.00 | 0 | | 0 |
| $Al_2O_3$ | 5.96 | 5.67 | 5.48 | 37.99 | 33.10 | 33.52 |
| $Fe_2O_3$ | 0.02 | 0.022 | 0.01 | 0 | 0.01 | 0.01 |
| MgO | 4.53 | 4.76 | 5.07 | 0 | 0.01 | 0.01 |
| CaO | 18.09 | 18.3 | 21.00 | 0 | 0.03 | 0.03 |
| $Na_2O$ | 5.41 | 4.98 | 5.13 | 23.09 | 25.20 | 25.52 |
| $K_2O$ | 10.86 | 9.99 | 11.50 | 0 | 0.01 | 0.01 |
| $P_2O_5$ | 3.52 | 3.71 | 4.67 | 0 | 0.40 | 0.41 |
| SrO | 0 | 0 | 0.05 | 0 | 0.00 | 0.00 |
| $ZrO_2$ | 0 | 0 | 0.01 | 0 | 0.00 | 0.00 |
| $B_2O_3$ | 51.41 | 51.3 | 45.60 | 38.91 | 40.00 | 40.50 |
| Total | 100 | 99.50 | 9.52 | 99.99 | 98.76 | 100 |

The NAB 006 glass contained over 30% alumina, while the control bioglass contained less than 6% alumina.

Example 4

Two glass compositions of $Na_2O$—$Al_2O_3$—$B_2O_3$ (NAB), and $R_2O$—RO—$Al_2O_3$—$P_2O_5$—$B_2O_3$ ($R_2$RAB) (where $R_2O=Li_2O$, $Na_2O$, and $K_2O$; and RO=MgO, CaO, SrO, and BaO) systems were produced with the invention. The batched compositions for the NAB system (in approximate mol %) are tabulated in Table 4. The batch composition for the $R_2$RAB system (in approximate mol %) are tabulated in Table 5.

TABLE 4

NAB System

| Oxides | NAB 001 | NAB 002 | NAB 003 | NAB 004 | NAB 005 | NAB 006 | NAB 007 | NAB 008 | NAB 009 |
|---|---|---|---|---|---|---|---|---|---|
| $Na_2O$ | 10 | 20 | 33.3 | 14 | 20 | 29 | 10 | 15 | 25 |
| $B_2O_3$ | 35 | 33 | 33.3 | 36 | 40 | 43 | 40 | 45 | 50 |
| $Al_2O_3$ | 55 | 47 | 33.3 | 50 | 40 | 29 | 50 | 40 | 25 |

TABLE 5

$R_2RAB$ System

| Oxides | 890GUB | 890GUC | 890GUD | 890GUE | 890GUF | 890GUG |
|---|---|---|---|---|---|---|
| $Na_2O$ | 6 | 6 | 6 | 6 | 6 | 6 |
| $K_2O$ | 7.9 | 7.9 | 7.9 | 7.9 | 7.9 | 7.9 |
| MgO | 7.7 | 7.7 | 7.7 | 7.7 | 7.7 | 7.7 |
| CaO | 22.1 | 22.1 | 22.1 | 22.1 | 22.1 | 22.1 |
| $B_2O_3$ | 54.6 | 50.6 | 46.6 | 42.6 | 38.6 | 34.6 |
| $P_2O_5$ | 1.7 | 1.7 | 1.7 | 1.7 | 1.7 | 1.7 |
| $Al_2O_3$ | 0 | 4 | 8 | 12 | 16 | 20 |

Selected compositions in the NAB and $R_2RAB$ systems were prepared from reagent grade sodium carbonate (99.5% $Na_2CO_3$)—Sigma Aldrich, St. Louis, Mo. 63103 USA, lithium carbonate (>99% $Li_2CO_3$)—Sigma Aldrich, St. Louis, Mo. 63103 USA), boric acid (99.5% $H_3BO_3$)—Sigma Aldrich, St. Louis, Mo. 63103 USA, calcium phosphate (>96% $Ca_3(PO_4)_2$)—Sigma Aldrich, St. Louis, Mo. 63103 USA, alumina (>99.5% $Al_2O_3$)—Strem Chemicals, Newburyport, Mass. 01950 USA, and aluminum phosphate (>97% $AlPO_4$)—Alfa Aesar, Ward Hill, Mass. 01835 USA. Glass formulations were made by batching and mixing appropriate amounts of powders via dry mixing. The mixed powders were then calcined in air at about 400° C. for about 6 hours to prevent foaming during melting. Melting was carried out in alumina crucibles covered with alumina lids in order to minimize volatilization in these glass compositions. The melting temperatures range from about 1100° to about 1450° C. for about 2 hours to about 4 hours depending on the glass composition. The molten glass was poured either into a steel plate or into a graphite mold. The glass obtained by these quenching methods were annealed at about 400° C. for about 30 minutes and then slowly cooled to room temperature (approximately 25° C.) at a rate of about 2° C./min.

Phase separations of these glasses were conducted in a two-step process. First, glass nucleation was carried out at about 450° C. to about 500° C. Second, phase separation occurred at a temperature between about 600° C. and about 650° C., depending on the glass composition. The glasses were then characterized.

Glass Melting Characteristics

Figure 3A:
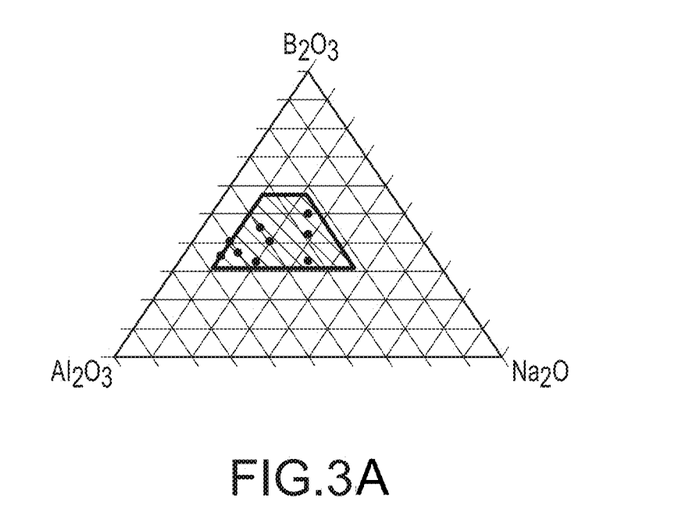
FIG. 3A illustrates ternary diagram ($Na_2O$—$Al_2O$—$B_2O_3$) for producing high alumina content glasses.
Figure 3B:
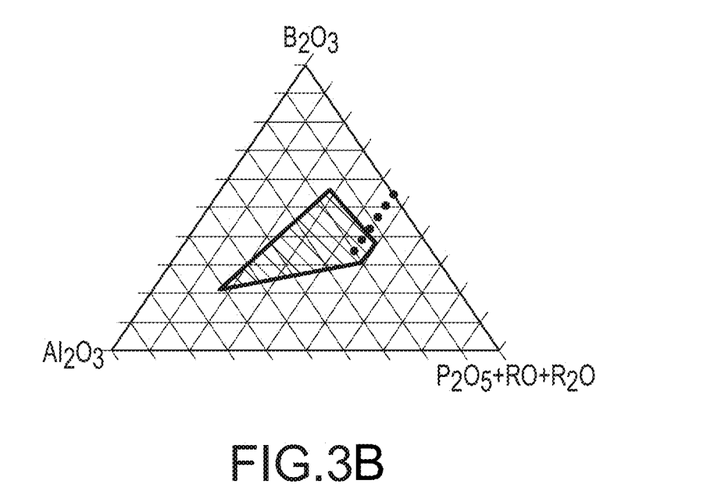
FIG. 3B illustrates a ternary diagram ($R_2O$—$RO$—$P_2O_5$) for producing high alumina content glasses.

FIGS. 3A and 3B illustrate a NAB ternary diagram (FIG. 3A) for producing high alumina content glasses and a ternary diagram for $R_2O$—RO—$P_2O_5$ (FIG. 3B) for producing high alumina content glasses. Each grit represents 10 mol % increments. The compositional area of interest is illustrated as shaded area in the diagrams and the specific compositions formulated and batched as solid dots. In the NAB system (see compositions in FIG. 3A and Table 4), it was found that glasses with compositions below 40 mol % alumina can be easily made by quenching with little or no crystallization. It was observed that the yield of glass poured from the crucible decreased with increasing alumina content in the glass. Alumina, a glass intermediate, significantly reduces the ability to form a glass in NAB compositions that contain more than 40 mol % alumina. It is also to be noted that the glass compositions in the NAB system were highly corrosive to alumina. Severe corrosion and erosion of the alumina crucibles was observed for all the compositions that were melted in this system. It is likely that this melting reaction will result in significant amounts of alumina being leached out from the crucible into the glass melt. This is consistent with the earlier observation that the yield of glass decreases with increasing alumina content in the glass. It is expected that significant amounts of alumina that was leached out by corrosive erosion resulted in increased difficulties with melting and thus lowered the yield of glasses in compositions that contain over 40 mol % alumina. This corrosive effect can be minimized significantly by using noble metal crucibles and/or by compensating the initial batch formulation by taking into account the amount of alumina dissolved, from the crucible, in the melt.

The $R_2O$ in the $R_2RAB$ system was $Li_2O$, $Na_2O$, $K_2O$, and the RO was MgO, CaO, SrO and BaO. In the $R_2RAB$ system (FIG. 3B), a series of six glasses were made according to compositions shown in Table 5. Systematic substitutions of $Al_2O_3$ for $B_2O_3$ (about 0-20 mol % alumina in about 4 mol % increments) were conducted to see the effect of alumina additions on the chemical and mechanical properties of the glass. Since the amount of alumina used in this system was significantly less than that in the NAB system, no difficulties were encountered in melting and forming these glass compositions.

Compositional Analysis

The chemical composition of the as-formed glasses was characterized using x-ray fluorescence (XRF) and ICP in order determine and compare the initial chemical formulation of the batch with that of the resultant glass.

The XRF and ICP analyses were conducted on a single glass composition (NAB 006) in the NAB system to compare the batched and final chemical formulation of the resultant glass. The results of the two techniques are shown in Table 6. All values in Table 6 are approximate. NAB006 contains more than about 30% (by weight) of alumina. The inventors believe this is the first demonstration of high alumina content glass that made intentionally using phase separation.

TABLE 6

NAB 006 Composition (wt %)

| Oxide | Batch | ICP/XRF |
|---|---|---|
| $SiO_2$ | 0 | 0 |
| $Al_2O_3$ | 38.0 | 33.52 |
| $Fe_2O_3$ | 0 | 0.01 |
| MgO | 0 | 0.01 |
| CaO | 0 | 0.03 |
| $Na_2O$ | 23.09 | 25.52 |

TABLE 6-continued

NAB 006 Composition (wt %)

| Oxide | Batch | ICP/XRF |
|---|---|---|
| P$_2$O$_5$ | 0 | 0.41 |
| SrO | 0 | 0.00 |
| ZrO$_2$ | 0 | 0.00 |
| B$_2$O$_3$ | 38.91 | 40.50 |
| Total | 100 | 100 |

ICP analyses for the R$_2$RAB system was done for all the compositions melted. Table 7 shows the selected batched compositions (nominal compositions) along with the corresponding chemical analysis of the resultant glasses. The values are in approximate mol %.

TABLE 7

| Oxides | 890GUB | 890GUC | 890GUD | 890GUE | 890GUF | 890GUG |
|---|---|---|---|---|---|---|
| *Batched Compositions* | | | | | | |
| Na$_2$O | 6 | 6 | 6 | 6 | 6 | 6 |
| K$_2$O | 7.9 | 7.9 | 7.9 | 7.9 | 7.9 | 7.9 |
| MgO | 7.7 | 7.7 | 7.7 | 7.7 | 7.7 | 7.7 |
| CaO | 22.1 | 22.1 | 22.1 | 22.1 | 22.1 | 22.1 |
| B$_2$O$_3$ | | | | | | |
| P$_2$O$_5$ | 1.7 | 1.7 | 1.7 | 1.7 | 1.7 | 1.7 |
| Al$_2$O$_3$ | | | | | | |
| SiO$_3$ | 0 | 0 | 0 | 0 | 0 | 0 |
| Fe$_2$O$_3$ | 0 | 0 | 0 | 0 | 0 | 0 |
| Total | 100 | 100 | 100 | 100 | 100 | 100 |
| *Analyzed Compositions* | | | | | | |
| Na$_2$O | 5.53 | 5.49 | 5.48 | 5.99 | 5.56 | 5.67 |
| K$_2$O | 7.35 | 7.25 | 7.04 | 0.03 | 7.11 | 7.18 |
| MgO | 8.14 | 8.08 | 8.27 | 7.46 | 8.43 | 8.95 |
| CaO | 22.78 | 22.32 | 23.07 | 23.50 | 23.43 | 22.70 |
| B$_2$O$_3$ | 52.74 | 50.39 | 45.45 | 47.03 | 37.54 | 34.06 |
| P$_2$O$_5$ | 2.55 | 1.79 | 1.98 | 1.80 | 1.83 | 1.77 |
| Al$_2$O$_3$ | 0.03 | 3.80 | 7.64 | 12.93 | 15.56 | 19.33 |
| SiO$_3$ | 0.86 | 0.88 | 1.06 | 1.25 | 0.54 | 0.33 |
| Fe$_2$O$_3$ | 0.01 | 0.01 | 0.01 | 0.01 | 0.01 | 0.01 |
| Total | 100 | 100 | 100 | 100 | 100 | 100 |

The glasses with alumina content above about 16 mol % are relevant. There is excellent agreement between the batched or nominal glass compositions and the analyzed glass compositions. The density of these glasses was measured using Archimedes technique and was found to be about 2.5 g/cm$^3$ and are shown in Table 8. All values in Table 8 are approximate.

TABLE 8

| | Maximum Crystallization Temperature (° C.) | | | Density |
|---|---|---|---|---|
| Code | Duration (h) | Air | Internal | Platinum | (g/cc) |
| 890GUC | 72 | 1020 | 1020 | 1020 | 2.51 |
| 890GUD | isothermal | >1000 | >1000 | >1000 | 2.51 |
| 890GUE | 72 | 980 | 980 | 980 | 2.56 |
| 890GUF | 24 | 1010 | 1010 | 1015 | 2.52 |
| 890GUG | 24 | 1010 | 1010 | 1010 | 2.51 |

The densities of these glasses are almost independent of the alumina content in the glass. This result is expected because the Al$_2$O$_3$/[RO+R$_2$O] ratio is far from the unity, indicating that the glass network structure is very open.

Measurement of Glass Transition Temperature (T$_g$) and Thermal Expansion

The glass transformation temperatures and thermal expansion coefficients were performed on the glass specimens of dimensions approximately 15 mm×5 mm×5 mm. A Netzsch DIL 402C vacuum tight horizontal pushrod dilatometer fitted with a Netzsch TA SC 414/3 temperature controller (Netzsch Instruments, MA 01803 USA) was utilized to measure the thermal expansion of all the samples. The measurements were performed at a heating and cooling rate of about 10° C./min between room temperature and about 500° C. to about 600° C. (depending on composition).

An alumina sample holder and pushrod were used with cubic zirconia (based on about 10 mol % yttria stabilized zirconia) spacers to prevent the glass sample from fusing to the pushrod. A constant force of about 0.3 N was applied to the specimen cross-section during the measurements. A fused silica specimen was used as a reference standard to perform a calibration prior to performing the tests on all the samples. The average thermal expansion coefficient was calculated from the measurements in the temperature range of about 50° C. to about 350° C.

Measurement of Liquidus Temperature

Liquidus temperature was measure by the standard gradient boat liquidus technique. In this technique, platinum boats are filled with −20 mesh crushed glass samples and melted in a gradient furnace. Observations of the maximum temperature were crystals were observed were made on the slab sample with at least 150× magnification.

The liquidus temperature was measured by the standard gradient boat liquidus technique for all the compositions in the R$_2$RAB system. The liquidus temperature for all the glasses investigated in this system is about 1000°±20° C. and the results are tabulated in Table 9 for the various compositions.

Thermal Expansion Characteristics

Figure 4A:
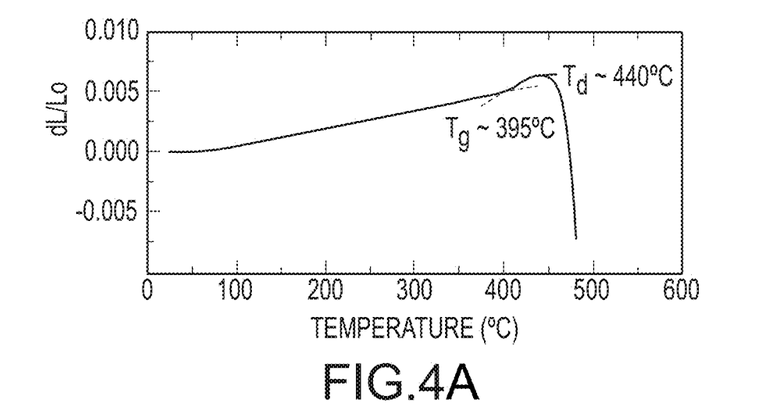
FIG. 4A illustrates a dilatometric curve of NAB 003 from room temperature to about 500° C.
Figure 4B:
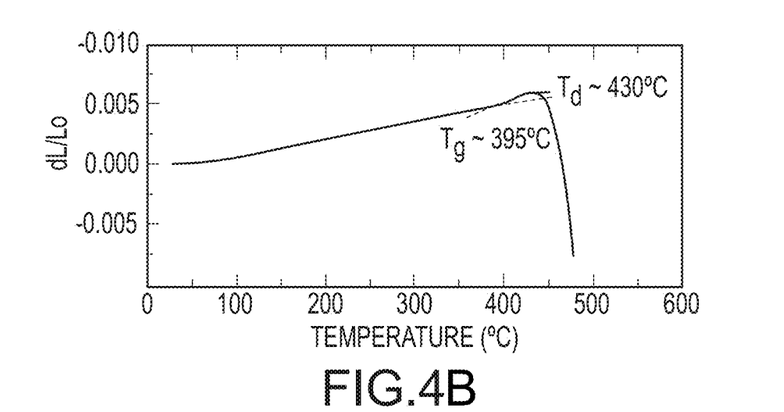
FIG. 4B illustrates a dilatometric curve for NAB 006 from room temperature to about 500° C.
Figure 4C:
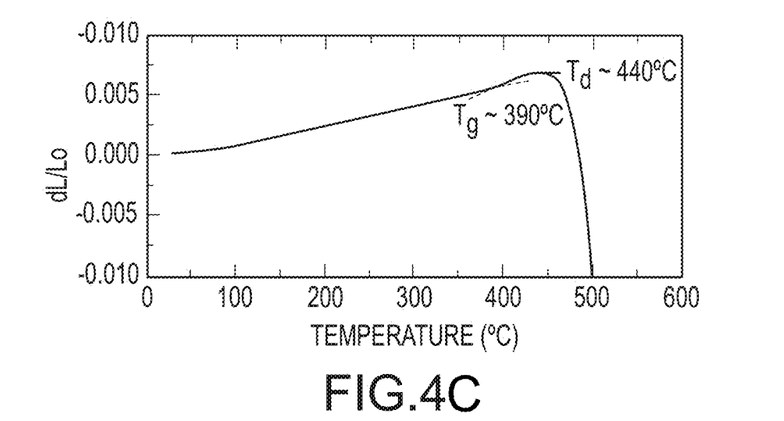
FIG. 4C illustrates a dilatometric curve for NAB 009 from room temperature to about 500° C.
Figure 5A:
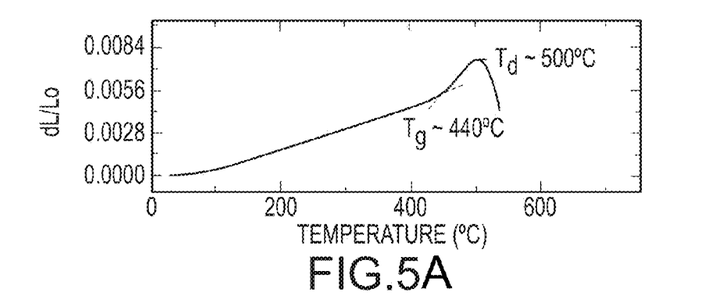
FIG. 5A illustrates a dilatometric curve for 890 GUC between about room temperature and about 580° C.
Figure 5B:
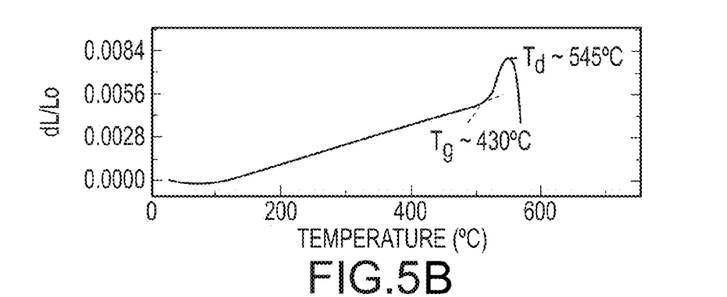
FIG. 5B illustrates a dilatometric curve for 890 GUF between about room temperature and about 580° C.
Figure 5C:
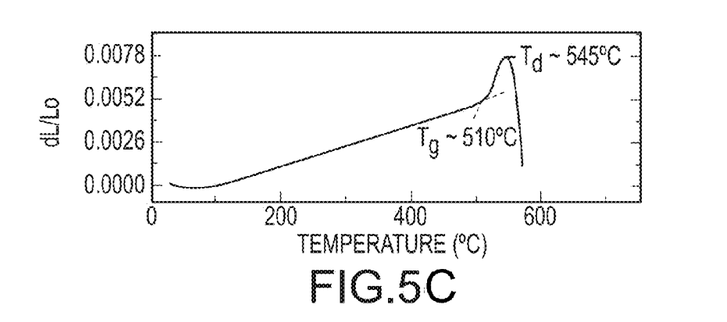
FIG. 5C illustrates a dilatometric curve for 890 GUE between about room temperature and about 580° C.
Figure 5D:
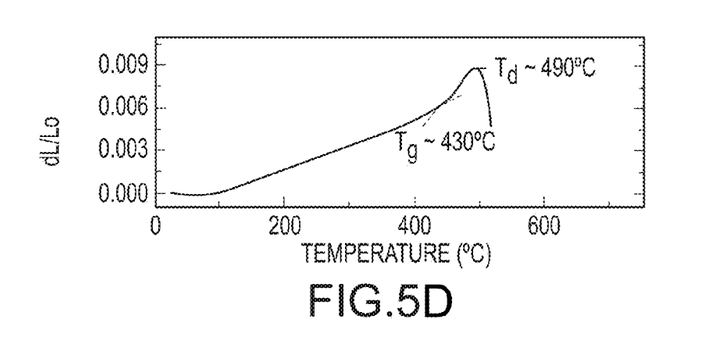
FIG. 5D illustrates a dilatometric curve for 890 GUD between about room temperature and about 580° C.

The dilatometric curves of the NAB based glass compositions (NAB 003, NAB 006 and NAB 009) from room temperature to about 500° C. are illustrated in FIG. 4A-C, respectively. The linear coefficient of thermal expansion (α) is calculated from:

$$\alpha(T) = \frac{1}{L_o}\frac{\partial L}{\partial T} \quad (1)$$

where $L_o$ is the initial length of the sample. The average CTE of these glasses between 50 and 350° C. range from about $14\times10^{-6}$/° C. to about $15.5\times10^{-6}$/° C. and this behavior can be correlated with the alumina content of the glass. The CTE of the glass increases from about $14\times10^{-6}$/° C. to about $15.5\times10^{-6}$/° C. on increasing the alumina content from about 25 to about 33.3 mol %, as seen in FIG. 4A-C. The glass onset transformation temperatures of the three glasses are also shown in FIG. 4A-C. The three glasses have a glass transformation temperature ($T_g$) of ~395° C. and a dilatometric softening point ($T_d$) of ~440° C. (which correspond approximately to the melt viscosities of about $10^{11.3}$ Pa-s (NAB009) and $10^8$-$10^9$ Pa-s, (NAB006 and NAB003) respectively. These values ($T_g$ and $T_d$) are almost independent of the alumina content in the glass as illustrated in FIG. 4A-C. The average CTE, Td and Tg for each sample is disclosed in Table 9. The values listed in Table 9 are approximate.

TABLE 9

| Sample | $T_g$ (° C.) | $T_d$ (° C.) | CTE (ppm/° C.) (from 50° C. to 350° C.) |
|---|---|---|---|
| NAB009 | 395 | 440 | 14.0 |
| NAB006 | 395 | 430 | 14.2 |
| NAB003 | 390 | 440 | 15.5 |

Figure 6:
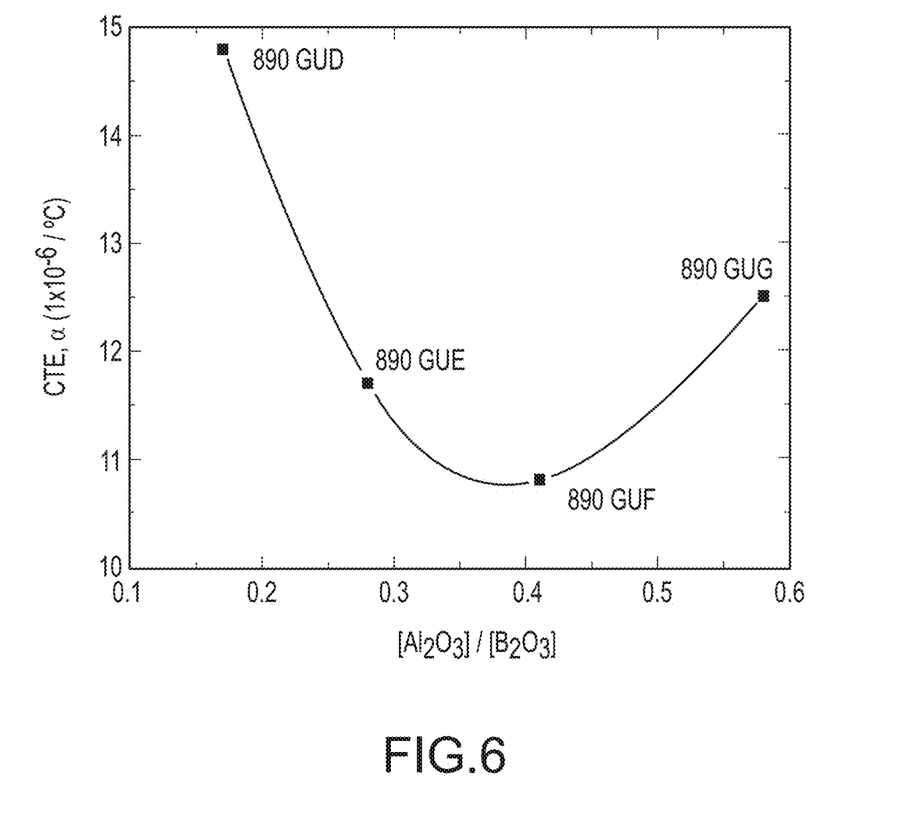
FIG. 6 illustrates the coefficient of thermal expansion of respective $R_2RAB$ based glass compositions as a function of the molar ration of $Al_2O_3/B_2O_3$.

The dilatometric curves for the glasses in the $R_2RAB$ based glass compositions (890 GUC, 890 GUF, 890 GUE and 890 GUD) between about room temperature and about 580° C. are illustrated in FIG. 5A-D, respectively. The average CTE of these glasses between about 50° C. and about 350° C. range from about $10.8\times10^{-6}$/° C. to about $14.8\times10^{-6}$/° C. and this behavior can be correlated to the composition of these glasses. FIG. 6 the coefficient of thermal expansion of respective $R_2RAB$ based glass compositions as a function of the molar ration of $Al_2O_3/B_2O_3$. It is clear that a CTE minimum is observed around the glass composition GUF where the $[Al_2O_3/B_2O_3]$ is about 0.4. This CTE minimum may be contributed to the borate anomaly observed in the alkali-alkaline earth-alumina borate systems. The average CTE, $T_d$ and $T_g$ for each sample is disclosed in Table 10. The values listed in Table 10 are approximate.

TABLE 10

| Sample | $T_g$ (° C.) | $T_d$ (° C.) | CTE (ppm/° C.) (from 50° C. to 350° C.) |
|---|---|---|---|
| 890 GUC | 440 | 500 | 12.5 |
| 890 GUF | 430 | 545 | 10.8 |
| 890 GUE | 510 | 545 | 11.7 |
| 809 GUD | 430 | 490 | 14.8 |

Phase Separation and Liquid Immiscibility

Phase separation on the NAB system of glasses can be easily achieved by a two-step heat treatment process at temperatures between about 450° C. and about 500° C. for nucleation and between about 600° C. and about 650° C. for growth of the phase separation, for relatively short period of time.

Figure 7:
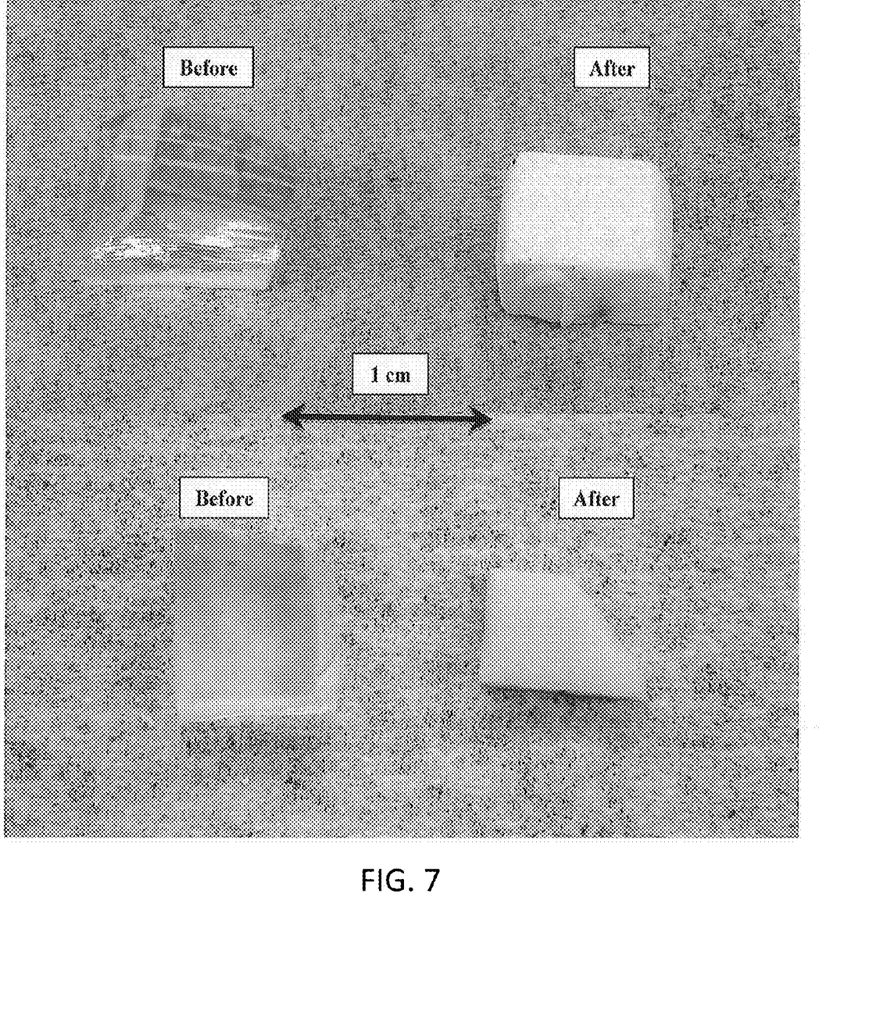
FIG. 7 illustrates the composition of NAB006 and 890GUG before and after heat treatment.

FIG. 7 illustrates the composition of NAB006 and 890GUG before and after heat treatment. The top illustration of FIG. 7 illustrates a photograph of one of NAB006 before and after heat treatment at about 600° C. for about 30 minutes. Opacity of the glass is clearly observed after heat treatment indicative of phase separation. FIG. 7 (bottom) also illustrates a photograph of GUG glass before and after phase separation under similar conditions.

Figure 8:
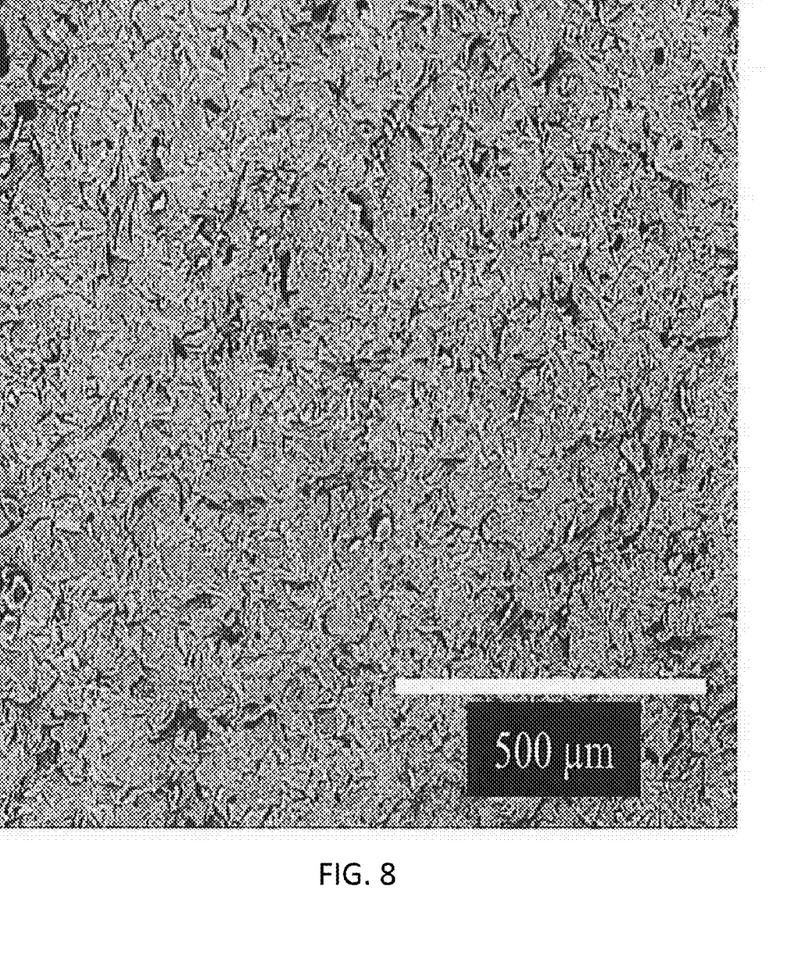
FIG. 8 illustrates a SEM micrograph of the fracture surface for NAB006 following leaching.

Porous alumina rich glasses can be produced by leaching away the alumina lean phases in these glass systems. Preliminary leaching experiments were carried out by boiling samples in distilled water for about 1 hour. FIG. 8 illustrates a SEM micrograph of the fracture surface for the NAB 006 glass composition leached by boiling in distilled water for about 1 hour. Isolated and interconnected porosity ranging from about 10 μm to about 90 μm is observed in the micrograph indicative of leaching effects. These porous alumina rich glasses may be consolidated to produce a dense glass which has higher alumina content than the parent glass.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for producing a porous high alumina content glass, comprising:
    mixing greater than about 20 mol % alumina and between about 30 mol % and about 80 mol % of an oxide to produce a mixture;
    heat treating the mixture to produce a phase separated material comprising an alumina-rich phase and an alumina-lean phase;
    cooling the phase separated material; and
    leaching the alumina-lean phase from the phase separated material to produce the porous high alumina content glass, wherein an acid utilized in the leaching is at least one of a hydrochloric acid, a nitric acid, a sulfuric acid, a phosphoric acid, a hydrobromic acid, a hydrofluoric acid, a halogen oxoacids water, or boiling water.

2. The method of claim 1, wherein the oxide may be at least one of $B_2O_3$, $P_2O_5$, $Na_2O$, $K_2O$, $Li_2O$, CaO, MgO, SrO, BaO, $SiO_2$, and $TiO_2$.

3. The method of claim 1, wherein an alumina content of the porous high alumina content glass is between about 20 mol % and about 75 mol %.

4. The method of claim 1, wherein the heat-treating step is at a temperature between about 300° C. and about 1000° C.

5. The method of claim 1, wherein further comprising calcining the mixture.

6. The method of claim 1, further comprising:
    washing the porous high alumina content glass with a water to produce a washed glass;
    drying the washed glass to produce a dry glass; and
    firing the dry glass to produce a dense high alumina content glass.

7. The method of claim 6, wherein a firing temperature is between about 500° C. and about 900° C.

8. A porous high alumina content glass comprising:
greater than about 20 mol % alumina;
an oxide; and
a dopant, wherein the dopant is at least one of tin oxide, cerium oxide, sulfur oxide, water, cobalt oxide, copper oxide, gold, or silver.

9. The glass of claim 8, wherein the oxide is selected from the group consisting of $B_2O_3$, $P_2O_5$, $Na_2O$, $K_2O$, $Li_2O$, CaO, MgO, SrO, BaO, $SiO_2$, $TiO_2$ and mixtures thereof.

10. The glass of claim 8, wherein an oxide content is between about 30 mol % and about 80 mol % of the porous high alumina content glass.

11. The glass of claim 8, wherein a porosity of the porous high alumina content glass is between about 0% and about 35%.

12. A method to form a high content alumina glass, comprising:
mixing an alumina powder and an oxide powder to form a mixture, wherein the alumina powder comprises at least about 20 mol % of the mixture and wherein the oxide comprises at least about 30 mol % of the mixture;
calcining the mixture to form a calcined mixture;
melting the calcined mixture to form a melt;
quenching the melt to form a quenched material;
annealing the quenched material to form an annealed material;
nucleating the annealed material to form a material;
phase separating the material to form a separated material comprising an alumina-rich phase and an alumina-lean phase; and
leaching the separated material to leach the alumina-lean phase to produce the high content alumina glass.

13. The method of claim 12, wherein the calcination occurs in air at a calcination temperature between about 300° C. and about 600° C.

14. The method of claim 12, wherein a melting temperature is between about 1000° C. and about 1500° C.

15. The method of claim 12, wherein an annealing temperature is between about 300° C. and about 600° C.

16. The method of claim 12, wherein a nucleation is between about 300° C. and about 600° C.

17. The method of claim 12, wherein an acid of the leaching step is at least one of a hydrochloric acid, a nitric acid, a sulfuric acid, a phosphoric acid, a hydrobromic acid, a hydrofluoric acid, or a halogen oxoacids water.

18. The method of claim 12, further comprising:
washing the high content alumina glass to produce a washed glass;
drying the washed glass to produce a dry glass; and
firing the dry glass to produce a dense high content alumina glass.

19. The method of claim 1, further comprising melting the mixture at a temperature between about 1000° C. and 1500° C.

20. The method of claim 1, wherein the leaching occurs at a temperature between about 25° C. and about 100° C.

* * * * *